United States Patent
Stephenson (10) Patent No.: US 9,357,629 B2
(45) Date of Patent: May 31, 2016

(54) NEUTRON GENERATOR

(75) Inventor: Kenneth E. Stephenson, Plainsboro, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1972 days.

(21) Appl. No.: 12/393,462

(22) Filed: Feb. 26, 2009

(65) Prior Publication Data

US 2011/0180698 A1    Jul. 28, 2011

Related U.S. Application Data

(60) Provisional application No. 61/146,233, filed on Jan. 21, 2009.

(51) Int. Cl.
*G01V 5/10* (2006.01)
*H05H 3/06* (2006.01)

(52) U.S. Cl.
CPC ........................ *H05H 3/06* (2013.01)

(58) Field of Classification Search
USPC ......................................... 250/261.1
See application file for complete search history.

(56) References Cited

U.S. PATENT DOCUMENTS 2,983,834 A    5/1955  Reiffel
2,769,096 A   10/1956  Frey, Jr.

(Continued)

FOREIGN PATENT DOCUMENTS

| EP | 2389790 A1 | 11/2011 |
|---|---|---|
| GB | 2092841 A | 8/1982 |
| GB | 2429832 A | 3/2007 |
| JP | 09133626 A | 5/1997 |
| WO | 2010090795 A1 | 8/2010 |

OTHER PUBLICATIONS

Examination Report issued in related CA application 2749717 on Dec. 2, 2015, 3 pages.

(Continued)

*Primary Examiner* — David Porta
*Assistant Examiner* — Shun Lee
(74) *Attorney, Agent, or Firm* — Michael Dae (57) ABSTRACT

A neutron generator includes a sealed envelope providing a low pressure environment for a gas. One end of the envelope defines an ion source chamber. A target electrode is disposed at the other end of the envelope. An extracting electrode is spaced apart from the target electrode by an accelerating gap. The extracting electrode bounds the ion source chamber. A dispenser cathode electrode and grid electrode are disposed in the ion source chamber for inducing ionization in the ion source chamber. The dispenser cathode electrode, the grid electrode and the extracting electrode operate at a positive high voltage potential and the target electrode operates at or near ground potential. This configuration provides an electric field gradient that accelerates ions towards the target electrode to induce collisions of ions with target material, thereby causing fusion reactions that generate neutrons. High voltage power supply circuit means supplies a positive high voltage signal to the electrodes of the ion source. The positive high voltage signal has a low voltage signal component floating on a positive high voltage signal component. For the dispensing cathode electrode, the low voltage signal component can be a DC or AC signal suitable for emitting electrons from the dispensing cathode electrode. For the grid electrode, the low voltage signal component can be a positive pulsed-mode signal (preferably with magnitude in the range between 100 to 300 volts). High voltage insulation surrounds and electrically insulates the high voltage power supply circuit means. Other ion source electrode configurations, such as cold cathode (Penning) ion source and RF-driven ion source, can also be used.

34 Claims, 11 Drawing Sheets

(56) References Cited

U.S. PATENT DOCUMENTS

| | | | |
|---|---|---|---|
| 2,880,373 A * | 3/1959 | Soloway | 315/108 |
| 2,967,245 A | 1/1961 | Soloway | |
| 2,992,333 A | 7/1961 | Alfred | |
| 3,020,408 A * | 2/1962 | Martin et al. | 376/109 |
| 3,113,213 A | 12/1963 | Brinkerhoff et al. | |
| 3,518,432 A | 6/1970 | Uleski | |
| 3,546,512 A | 12/1970 | Frentrop | |
| 3,581,093 A | 5/1971 | Carr et al. | |
| 3,756,682 A | 9/1973 | Frentrop | |
| 3,924,138 A * | 12/1975 | Hopkinson | 376/111 |
| 4,404,163 A | 9/1983 | Bridges | |
| 4,600,838 A | 7/1986 | Steinman et al. | |
| 4,721,853 A | 1/1988 | Wraight | |
| 4,794,792 A | 1/1989 | Flaum et al. | |
| 5,293,410 A | 3/1994 | Chen et al. | |
| 5,313,504 A | 5/1994 | Czirr | |
| 5,680,431 A | 10/1997 | Pietras, III et al. | |
| 6,474,143 B1 | 11/2002 | Herod | |
| 7,073,378 B2 | 7/2006 | Smits et al. | |
| 2003/0076249 A1 * | 4/2003 | Dummermuth et al. | 341/110 |
| 2005/0207880 A1 * | 9/2005 | Tarelin et al. | 415/1 |
| 2007/0227234 A1 | 10/2007 | Weisinger | |
| 2007/0237281 A1 | 10/2007 | Yakovlyev | |
| 2011/0180698 A1 | 7/2011 | Stephenson | |

OTHER PUBLICATIONS

Stephenson "Possibility for High Neutron Yield With Grounded Target Minitron Operation", Oct. 3, 1985, 8 Pages.
Examination report issued in related application No. GC 2010-16851, on Oct. 29, 3 pages.
International Search Report and Written Opinion issued in corresponding International Application No. PCT/US2010/020711, on Jun. 15, 2010, 8 Pages.

* cited by examiner

NEUTRON GENERATOR

BACKGROUND OF THE INVENTION

1. Field of the Invention

This invention relates to neutron generating systems and more particularly pertains to sealed-tube neutron generators especially adapted to traverse the narrow confines of a well or borehole, although useful in a variety of other applications.

2. The Related Art

The use of a generator of high energy neutrons has been known for a long time for neutron-gamma ray or neutron-neutron logging in oil well logging tools. Accordingly, for illustrative purposes, the invention is described in more complete detail in connection with a sealed-tube neutron generator suitable for use in a well logging tool.

Sealed-tube neutron generators usually have four major features:

(i) a gas source to supply the reacting elements, such as deuterium and tritium;
(ii) an ion source that strips electrons from the gas molecules, thus generating a plasma of electrons and positively charged ions;
iii) a target impregnated with deuterium and/or tritium; and
(iv) an accelerating gap which propels the ions from the plasma to the target with such energy that the bombarding ions collide and fuse with the deuterium or tritium nuclei of the target to generate and emit neutrons therefrom.

Ordinarily, a plasma of positively charged ions and electrons is produced by energetic collisions of electrons and uncharged gas molecules within the ion source. Two types of ion sources are typically used in neutron generators for well logging tools: a cold cathode (a.k.a. Penning) ion source and a hot (a.k.a. thermionic) cathode ion source. These ion sources employ anode and cathode electrodes of different potential that contribute to plasma production by accelerating electrons to energy higher than the ionization potential of the gas. Collisions of those energetic electrons with gas molecules produce additional electrons and ions.

Penning ion sources increase collision efficiency by lengthening the distance that the electrons travel within the ion source before they are neutralized by striking a positive electrode. The electron path length is increased by establishing a magnetic field which is perpendicular to the electric field within the ion source. The combined magnetic and electrical fields cause the electrons to describe a helical path within the ion source which substantially increases the distance traveled by the electrons within the ion source and thus enhances the collision probability and therefore the ionization and dissociation efficiency of the device. Examples of neutron generators including Penning ion sources used in logging tools are described e.g. in U.S. Pat. No. 3,546,512 or U.S. Pat. No. 3,756,682 both assigned to Schlumberger Technology Corporation.

Hot cathode ion sources comprise a dispenser cathode realized from a material that emits electrons when heated. A grid electrode extracts electrons from the cathode which, in turn, ionize the gas, generating ions. An extracting or focusing electrode extracts ions and focuses such ions so as to form an ion beam. An example of a neutron generator including a hot cathode ion source used in a logging tool is described e.g. in U.S. Pat. No. 5,293,410, assigned to Schlumberger Technology Corporation.

In these systems, the target floats at a negative high voltage potential, typically on the order of −70kV to −160kV (or less), with the ion source electrodes operating around ground potential, in order to provide the necessary electric field gradient to accelerate ions toward the target with enough energy that the bombarding ions generate and emit neutrons therefrom. Typically, on the order of 10 watts of power are dissipated in the target and the target is surrounded by high voltage insulation. Because of poor thermal conduction to the exterior (due to the fact that electrical insulators are generally poor thermal conductors), the temperature of the target can increase significantly compared to ambient temperature. At high ambient temperature, the target can overheat, leading to failure (loss of neutron output) of the neutron generator.

SUMMARY OF THE INVENTION

The neutron generator of the present invention includes a sealed envelope providing a low pressure environment for a suitable gas of hydrogen isotope(s). One end of the envelope defines an ion source chamber. A dispenser cathode electrode is disposed within the ion source chamber. A target electrode is disposed at the other end of the envelope. A grid electrode is spaced apart from the target electrode by an accelerating gap. The grid electrode bounds the ion source chamber. A housing surrounds the sealed envelope. High voltage power supply circuitry is housed with the housing, preferably adjacent or near the ion source chamber of the sealed envelope, and is electrically connected to the dispenser cathode electrode and the grid electrode. High voltage insulation surrounds the high voltage power supply circuitry and electrically insulates the housing (and low voltage electrical components housed therein) from the high voltage power supply circuitry.

During use, a low pressure gas of deuterium and/or tritium is provided in the sealed envelope. The high voltage power supply circuitry operates the dispenser cathode electrode and the grid electrode such that these electrodes float at a positive high voltage potential (e.g., typically in the range of +70kV to +160kV or more). The high voltage power supply circuitry supplies potential signals to the dispenser cathode electrode and the grid electrode for producing plasma in the ion source chamber. The target electrode operates at or near ground potential. The potential difference between the grid electrode (positive high voltage potential) and the target electrode (at or near ground potential) provides an electric field gradient over the accelerating gap between the grid electrode and the target electrode. This potential difference accelerates ions towards the target electrode to induce collisions of ions with target material, thereby causing fusion reactions that generate and emit neutrons from the target material.

In an illustrative embodiment, solid-form high voltage insulation is disposed within the housing and surrounds the high voltage power supply circuitry for high voltage insulation of such high voltage power supply circuitry. Such solid-form high voltage insulation is preferably realized by at least one tubular member of perfluoroalkoxy (more preferably realized by two concentric tubular members of perfluoroalkoxy, each having a wall thickness of at least 0.04 inches).

In another illustrative embodiment, solid-form high voltage insulation is disposed within the housing and is realized by a unitary element including first and second portions without any break in continuity therebetween. The first portion surrounds the high voltage power supply circuitry and the second portion surrounds the sealed envelope. The first portion provides for high voltage insulation of the high voltage power supply circuitry. The second portion preferably extends between the sealed envelope and the housing over a substantial portion of the lengthwise (axial) dimension of the sealed envelope in order to electrically insulate the housing (and low voltage components therein) from high voltages within the sealed envelope. Such solid-form high voltage insulation is preferably realized by at least one tubular member of perfluoroalkoxy (more preferably two concentric tubular members of perfluoroalkoxy, each having a wall thickness of at least 0.04 inches).

Liquid and/or gas electrically insulating materials can also be used to fill the space between the sealed envelope and the housing for high voltage insulating purposes.

In alternate embodiments, other ion source electrode configurations, such as cold cathode (Penning) ion source and RF-driven ion source configurations can be used. In such configurations, the high voltage power supply circuitry as described herein can be adapted to float the electrode(s) of the ion source at the desired positive high voltage potential and apply low voltage signals relative to the positive high voltage potential for operating the ion source electrode(s) of the neutron generator.

The neutron generator of the present invention employs a grounded target electrode, which reduces or eliminates the need for high voltage insulation of the target electrode. Because most good high voltage insulators provide poor thermal conduction, the reduction of high voltage insulation for the target electrode facilitates heat removal (cooling). With adequate cooling of the grounded target, run away depletion of the target under high beam operation can be avoided, which allows for sustenance of higher neutron output per unit of power dissipation on the target. Furthermore, with the target electrode operating at or near ground potential, problems associated with electron current leakage from the surfaces of the target electrode are avoided.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
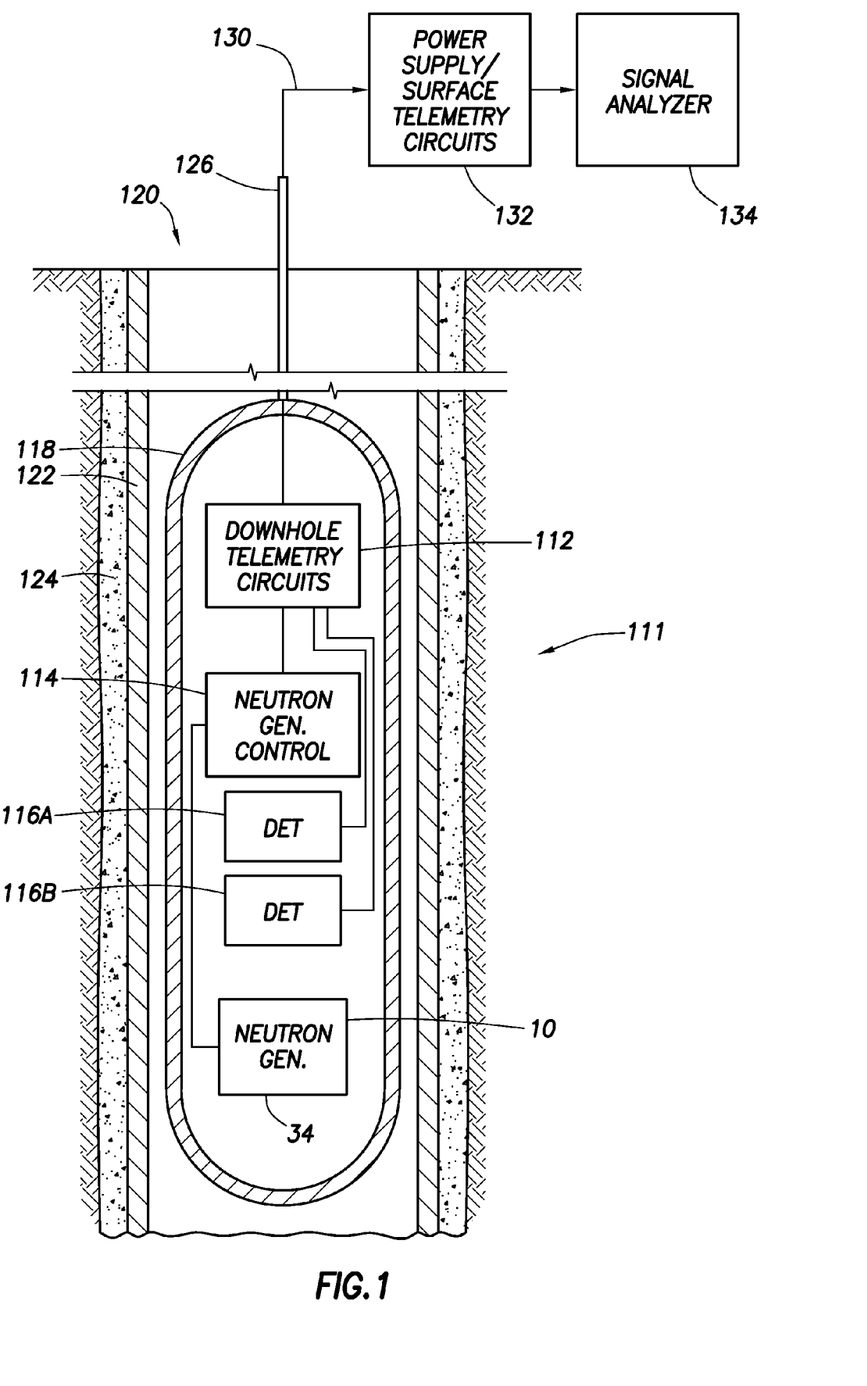
FIG. 1 is a schematic view of an exemplary downhole logging tool and associated surface instrumentation.
Figure 2:
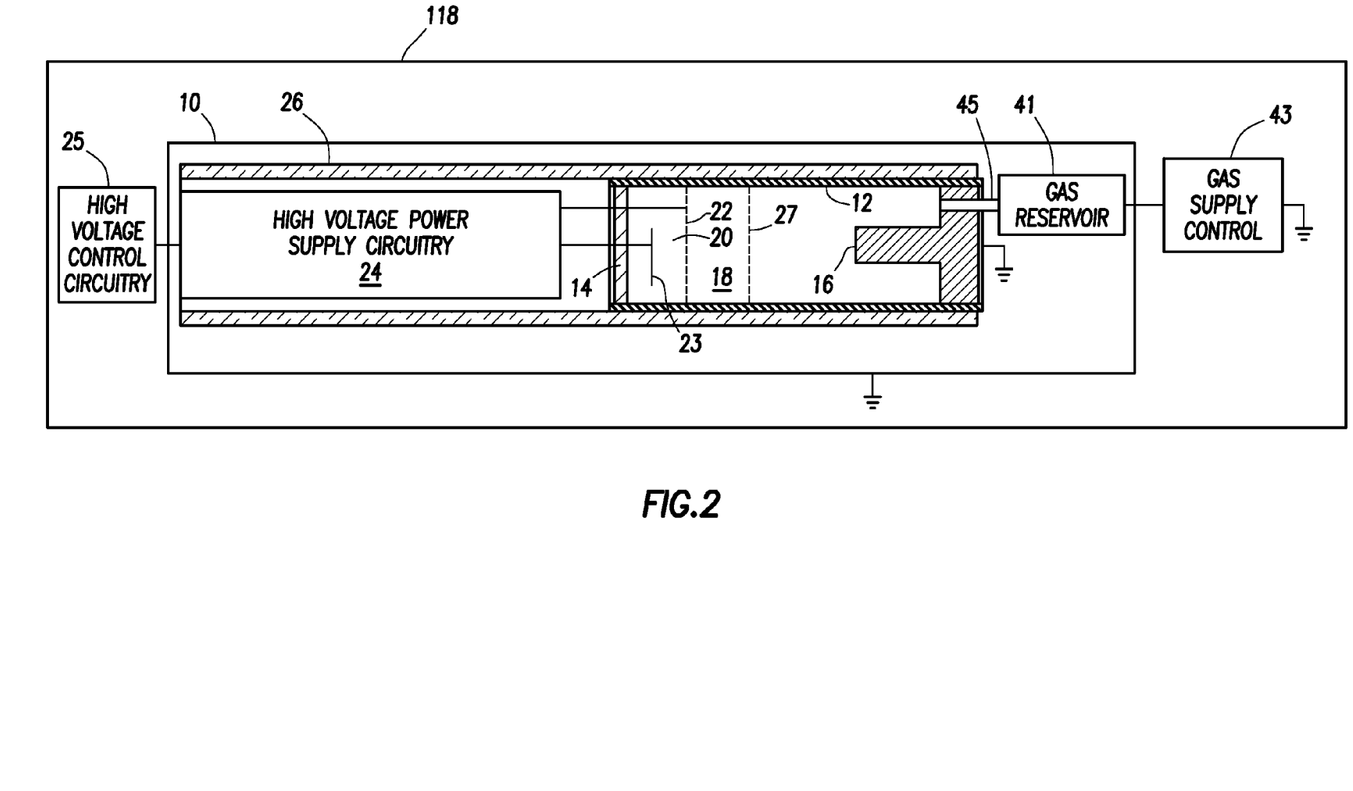
FIG. 2 is a schematic view of a neutron generator of the logging tool of FIG. 1 in accordance with the present invention.

Turning now to FIGS. 1 and 2, the neutron generator 10 in accordance with the present invention may be used as part of a logging tool 111 as shown. The neutron generator 10 includes a sealed hollow cylindrical tube or envelope 12. An ion source 18 is disposed at one end of the sealed envelope 12, and a target electrode 16 is disposed at the other end of the sealed envelope 12 as described below in more detail. The sealed envelope 12 and supporting high voltage electrical components are enclosed in a housing 34, which is referred to below as Neutron Generator (NG) housing 34. The NG housing 34 and supporting low voltage electrical circuit components 114 as well as other system components (e.g., downhole telemetry circuits 112 and at least one radiation detector (for example, two shown as 116A, 116B)) are housed in a sonde 118 that is configured to be moved through a borehole 120. The borehole 120 is illustrated as including a steel casing 122 and a surrounding cement annulus 124, although other borehole configurations (such as open holes) are also typically used in oil well applications. The sonde 118 is typically suspended in the borehole 120 by cable, coiled tubing or other means (labeled 126). Different modes of conveyance of the sonde 118 can be used, including wireline, slickline, TLC and logging while drilling. The sonde 118 can also be deployed for permanent monitoring. A multi-conductor power supply cable 130 may be carried by the suspension means 126 and to provide electrical power from the surface (by power supply circuitry 132) downhole to the sonde 118 and the electrical components therein, which include the downhole telemetry circuits 112, low-voltage neutron generator support circuitry 114 and radiation detectors 116A, 116B. Alternatively, in other modes of conveyance power may be supplied by batteries and/or a downhole power generator. The neutron generator 10 is operated to emit neutrons in order to irradiate the formation adjacent the sonde 118 with such neutrons. Neutrons and/or photons (gamma-rays) that return from the formation are detected by the radiation detectors 116A, 116B. The outputs of the radiation detectors 116A, 116B are communicated to the surface by cooperation of downhole telemetry circuitry 112 and surface telemetry circuitry 132, and analyzed by signal analyzer 134 to obtain information regarding the formation. The signal analyzer 134 is typically realized by a computer system executing signal analysis software for obtaining information regarding the formation. More particularly, oil, gas, water and the elements of the geological formations possess distinctive radiation signatures that permit identification of such geological formations. Signal analysis can also be carried out downhole within the sonde 118. The neutron generator 10 of the present invention can also be used in conjunction with other logging tools, including, but not limited to those described in U.S. Pat. Nos. 4,794,792; 4,721,853; and 4,600,838; and 5,313,504, and U.S. Pat. No. 7,073,378 which are herein incorporated by reference in their entireties.

As shown in FIG. 2, the neutron generator 10 includes a hollow cylindrical envelope 12 made of an insulating material such as quartz, glass or ceramic. A closing plate 14 and the target electrode 16 close the opposite ends of the envelope 12 to provide a sealed environment inside the envelope 12. Gas supply means supplies low pressure gas of deuterium and/or tritium to this envelope 12. In the preferred embodiment, the gas supply means includes a gas reservoir 41 that includes a helically wound filament of metal (such as tungsten) coated with a metal hydride film (such as a hydride of titanium, scandium, and/or zirconium) or the like as is well known. The ends of the filament are connected to gas supply control circuitry 43 that heats (typically by ohmic heating) the filament and the metal hydride film thereon. The filament and the metal hydride film thereon cools when electric current through the filament is turned off or minimized. The heating (or cooling) of the metal hydride film of the filament results in the emission (or absorption) of deuterium and/or tritium in gaseous form to thereby provide a low pressure supply of these gases (typically on the order of 1-100 millitorrs) and to control gas pressure during generator operation. The gas supply circuitry 43 is preferably located in the sonde 118 outside the NG housing 34, and the gas supply reservoir 41 is located inside the NG housing 34 near the target end of the sealed envelope 12. The gas reservoir 41 is fluidly coupled to the sealed envelope 12 by a feed tube 45. The gas reservoir 41 and the gas supply control circuitry 43 operate around ground potential (sometimes referred to as chassis potential), which simplifies the design of the gas supply control circuitry and reduces the need for high voltage insulation of the gas reservoir and supporting electrical components. Alternatively, the gas reservoir 41 can be realized by a non-evaporable getter, such as a sintered porous getter sold commercially by SAES Getters USA Inc. of Colorado Springs, Colo.

An ion source 18 is disposed at the end of the envelope 12 adjacent the closing plate 14 and spaced apart from the target electrode 16. The ion source 18 includes an ion source chamber 20 defined by a portion of the cylindrical wall of the tube 12. One side of the ion source chamber 20 is bounded by the closing plate 14. The other side of the ion source chamber 20 is bounded by an extracting electrode 27. A dispenser cathode electrode 23 and a grid electrode 22 are disposed within the ion source chamber 20. The dispenser cathode electrode 23 is a thermionic cathode, which includes an emitter block realized from a material that is susceptible to emitting electrons when heated. In the preferred embodiment, the emitter block includes a porous tungsten substrate impregnated with a material susceptible to emitting electrons when heated, such as compounds of barium oxide, strontium oxide, or combinations thereof. Other dispenser cathodes can be used, such as reservoir cathodes and the like. High voltage power supply circuitry 24, which preferably includes a Cockcroft-Walton voltage multiplier circuit as is well known, is housed with the NG housing 34, preferably adjacent or near the ion source chamber 20 of the sealed envelope 12. The high voltage power supply circuitry 24 is electrically connected to the dispenser cathode electrode 23, the grid electrode 22, and the extracting electrode 27 preferably by electrical feedthroughs (not shown) in the closing plate 14. The high voltage power supply circuitry 24 operates the dispenser cathode electrode 23, the grid electrode 22, and the extracting electrode such that the dispenser cathode electrode 23, the grid electrode 22 and the extracting electrode float at a positive high voltage potential (e.g., typically in a range between +70 kV to +160 kV or more). Control circuitry 25, which operates at low voltages, is housed in the sonde 118 outside the NG housing 34 and interfaces to the high voltage power supply circuitry 24 via an electrical feedthrough (not shown) in the NG housing 34. The control circuitry 25 controls operation of the high voltage power supply circuitry 24.

Solid-form high voltage insulation 26 surrounds the high voltage power supply circuitry 24 and electrically insulates the NG housing 34 (and low voltage electrical components housed therein) from high voltages produced by the high voltage power supply circuitry 24. The solid-form high voltage insulation 26 also surrounds the sealed envelope 12 and preferably extends between the sealed envelope 12 and the NG housing 34 over a substantial portion of the lengthwise (axial) dimension of the sealed envelope 12 in order to electrically insulate the NG housing 34 from high voltages within the sealed envelope 12. Liquid and/or gas electrically insulating materials (such as SF6 gas or the Fluorinert™ line of insulating liquids sold commercially by the 3M Company of St. Paul, Minn.) can also be used to fill the space between the sealed envelope 12 and the NG housing 34 for high voltage insulating purposes.

The target electrode 16 preferably comprises a thin metal hydride film of titanium, scandium, zirconium, erbium, or yttrium deposited on a surface of the target electrode 16 facing the extraction electrode 22. Other suitable targets can also be used. If needed, cooling fluid can be circulated through the target electrode 16 in order to counteract heating that results from operation (e.g., ion bombardment). The target electrode 16 is electrically coupled to ground potential such that it operates at or near ground potential.

During operation of the generator 10, low pressure gas produced by the gas reservoir 41 permeates the space inside the sealed envelope 12 (including the ion source chamber 20). The high voltage power supply circuitry 24 (under control of control circuitry 25) supplies positive high voltage potential signals to the dispenser cathode electrode 23, the grid electrode 22, and the extracting electrode 27 in a manner whereby the dispenser cathode electrode 23, the grid electrode 22, and the extracting electrode float at positive high voltage levels (e.g., typically in a range between +70 kV to +160 kV or more) and produce ionization in the ion source chamber 20. The target electrode 16 operates at or near ground potential. This configuration produces a high electric field gradient within the sealed envelope 12 in the accelerating gap between the extraction electrode 22 and the target electrode 16. This electric field gradient impels ions produced at the ion source 18 toward the target electrode 16 with such energy that the bombarding ions collide with deuterium or tritium target nuclei of the target electrode 16, thereby causing fusion reactions that generate neutrons.

In the preferred embodiment, the solid-form high voltage insulation 26 is realized by at least one tubular member of perfluoroalkoxy (PFA), and most preferably realized from two or more concentric PFA tubular members each having a wall thickness of at least 0.04 inches. Other solid-form electrically insulating materials can be used as a replacement or in combination with the high voltage insulation 26. Such solid-form insulating materials can include, but are not limited to, quartz, ceramic, polyethylene, Teflon®, etc.

Figure 3:
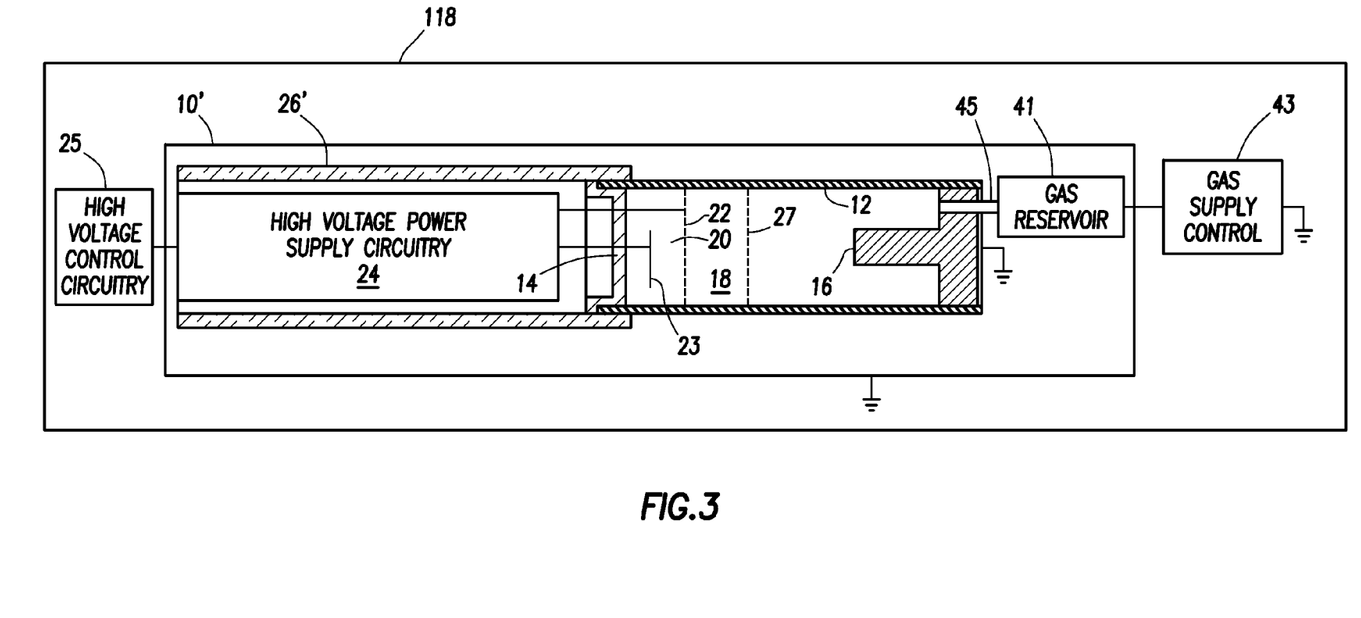
FIG. 3 is a schematic view of a neutron generator of the logging tool of FIG. 1 in accordance with an alternate embodiment of the present invention.

An alternate embodiment of a neutron generator 10' is shown in FIG. 3. In this alternate embodiment, the high voltage insulation system of the neutron generator as described above is modified to include solid-form high voltage insulation 26' that surrounds the high voltage power supply circuitry 24 and electrically insulates the NG housing 34 (and low voltage electrical components housed therein) from high voltages produced by the high voltage power supply circuitry 24. In the preferred embodiment, the high voltage insulation 26' is realized by at least one tubular member of perfluoroalkoxy (PFA), and most preferably realized from two or more concentric PFA tubular members each having a wall thickness of at least 0.04 inches. Other solid-form electrically insulating materials can be used as a replacement or in combination with the high voltage insulation 26'. Such solid-form insulating materials can include, but are not limited to, quartz, ceramic, polyethylene, etc.

Note that in the embodiment of FIG. 3, the high voltage insulation 26' does not extend between the sealed envelope 12 and the NG housing 34 over a substantial portion of the lengthwise (axial) dimension of the sealed envelope 12 as provided in the embodiment of FIG. 2. In this configuration, the insulating material of the wall(s) of the envelope 12 provides sufficient electrical insulation in order to protect the NG housing 34 from high voltages within the sealed tube envelope 12. Liquid and/or gas electrically insulating materials (such as SF6 gas or the Fluorinert™ line of insulating liquids sold commercially by the 3M Company of St. Paul, Minn.) can also be used to fill the space between the sealed envelope 12 and the NG housing 34 for insulating purposes.

The high voltage power supply circuitry 24 of FIGS. 2 and 3 can be adapted to provide controlled output of ions continuously (e.g. DC or CW continuous output mode) or in recurrent bursts (e,g., a pulsed output mode). For both the continuous output and pulsed output modes, the high voltage power supply circuitry 24 preferably employs a Cockcroft-Walton HV ladder 71 as shown in FIGS. 4, 5, 6, 7A and 7B, An AC source 73, preferably located outside the NG housing 34, is operated to drive the HV ladder 71 through an HV transformer 75 as is well known. The HV ladder 71 produces a positive high voltage signal that is supplied to the dispenser cathode electrode 23, the grid electrode 22 and the extracting electrode 27 in order to float these electrodes at the positive high voltage potentials as described herein. The positive high voltage output of the HV ladder 71 is also processed by circuitry that generates and outputs electrical signals to the dispenser cathode electrode 23, the grid electrode 22, and the extracting electrode, respectively, as required for desired operation of the generator.

In an illustrative embodiment, pulsed output mode is achieved by generating a heater signal (e.g., 2.5 volts positive or negative DC or AC) relative to the floating positive high voltage potential (e.g., typically in a range between +70 kV to +160 kV or more) and by generating a pulsed-mode signal that includes positive pulses (e.g., pulses in the range of +100 to +300 volts) relative to the floating positive high voltage potential. The heater signal is supplied to the dispenser cathode electrode 23. The pulsed-mode signal is supplied the grid electrode 22. The heater signal heats the dispenser cathode electrode 23 for inducing electron emission therefrom. During the positive pulses of the pulsed-mode signal, the electrons emitted from the dispenser cathode electrode 23 are swept to the grid electrode 22 and induce ionization in the ion source chamber 20. At the same time, the positive potential difference between the grid electrode 22 and the extracting electrode 27 sweeps ions from the ion source chamber 20 into the acceleration gap between the extracting electrode 27 and the target electrode 16. The high voltage power supply circuitry 24 is adapted to generate and output suitable heater signal and pulsed-mode signal for supply to the dispenser cathode electrode 23 and the grid electrode 22, respectively. As shown in FIGS. 4, 5, 6, 7A and 7B, there are many different mechanisms that can be used to generate and output the heater signal and pulsed-mode signal for supply to the dispenser cathode electrode 23 and the grid electrode 22, respectively.

Figure 4:
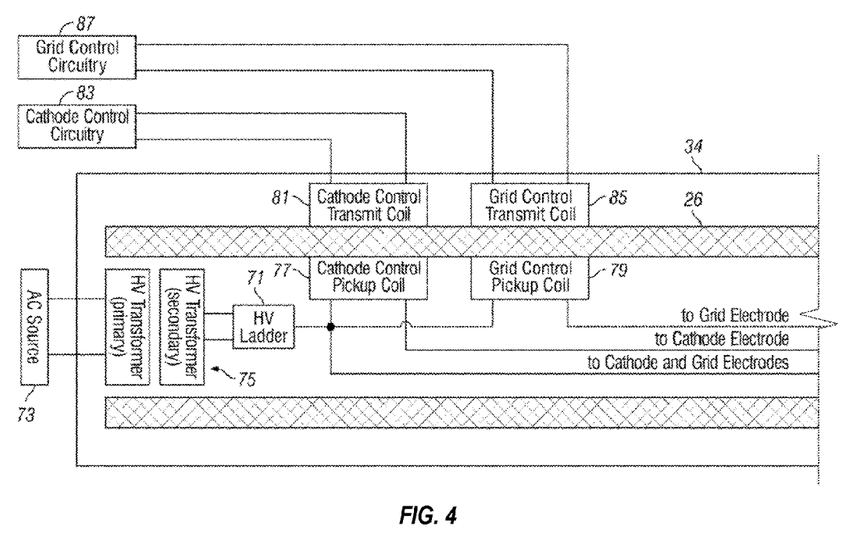
FIG. 4 is a schematic view of an embodiment of high voltage power supply circuitry and supporting control circuitry for use in the neutron generators of FIGS. 1-3.

In the embodiment of FIG. 4, the positive high voltage signal produced by the HV ladder 71 is coupled to a cathode control pickup coil 77 in series with the dispenser cathode electrode 23. The positive high voltage signal produced by the HV ladder 71 is also coupled to a grid control pickup coil 79 in series with the grid electrode 22. The pickup coils 77, 79 are located within the high voltage environment of the HV ladder 71 and preferably mounted to interior surface(s) of the high voltage insulation 26. A cathode control transmitter coil 81 is located outside the high voltage environment of the HV ladder 71 (preferably mounted onto the exterior of the high voltage insulation 26) within the NG housing 34 in proximity to the pickup coil 77. The cathode control transmitter coil 81 is coupled to low-voltage control circuitry 83 that is preferably located outside the NG housing 34. A grid control transmitter coil 85 is located outside the high voltage environment of the HV ladder 71 (preferably mounted onto the exterior to the high voltage insulation 26) within the NG housing 34 in proximity to the pickup coil 79. The grid control transmitter coil 85 is coupled to low-voltage control circuitry 87 that is preferably located outside the NG housing 34. The cathode control transmitter coil 81 and pickup coil 77 provide an inductive interface for generating a heater signal (e.g., 2.5 volts AC) relative to the floating positive high voltage potential produced by the HV ladder 71 and supplying the heater signal to the dispenser cathode electrode 23 under control of control circuitry 83. The grid control transmitter coil 85 and pickup coil 79 provide an inductive interface for generating a pulsed-mode signal that includes positive pulses (e.g., pulses in the range of +100 to +300 volts) relative to the floating positive high voltage potential produced by the HV ladder 71 and supplying the pulsed-mode signal to the grid electrode 22 under control of control circuitry 87.

In the embodiment of FIGS. 5, 6, 7A and 7B, the positive high voltage signal produced by the HV ladder 71 is supplied to a DC power supply circuit 91 that floats at the positive high voltage potentials produced by HV ladder 71. The DC power supply circuitry 91 generates a DC voltage supply signal relative to the positive high voltage potentials produced by the HV ladder 71. The DC voltage supply signal generated by the DC power supply circuitry 91 is output to a cathode supply circuitry 93 coupled in series with the dispenser cathode electrode 23 as well as to grid supply circuitry 95 coupled in series with the grid electrode 22. The cathode supply circuitry 93 converts the DC voltage supply signal to a DC or AC voltage level suitable for driving the dispenser cathode (e.g., a 2.5 volts DC). The grid supply circuitry 95 is a pulse generator circuit that uses the DC power supply signal to generate a pulsed-mode signal that includes positive pulses (e.g., pulses in the range of +100 to +300 volts) relative to the floating positive high voltage potential produced by the HV ladder 71. Feedback between the grid supply circuitry 95 and the cathode supply circuitry 93 can be used to control operation of the cathode supply circuitry.

The DC power supply circuitry 91 is preferably supplied with an input AC signal that is transformed to the desired DC voltage supply signal relative to the positive high voltage potentials produced by the HV ladder 71. Various mechanisms can be used to generate the input AC signal inside the high voltage environment of the high voltage power supply circuitry 24 under control from outside the high voltage while maintaining high voltage standoff of the high voltage environment.

Figure 5:
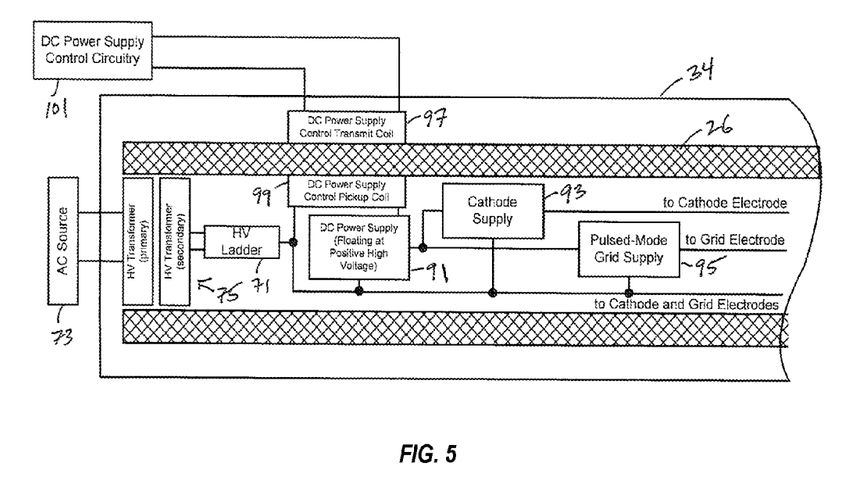
FIG. 5 is a schematic view of an embodiment of high voltage power supply circuitry and supporting control circuitry for use in the neutron generators of FIGS. 1-3.

For example, in the embodiment shown in FIG. 5, the input AC signal is generated by an inductive interface between a transmitter coil 97 and a pickup coil 99. The transmitter coil 97 is located outside the high voltage environment (i.e., preferably mounted on the exterior surface of the high voltage insulation 26) and within the NG housing 34 in proximity to the pickup coil 99. The pickup coil 99 is located within the high voltage environment (i.e., preferably mounted on the interior surface of the high voltage insulation 26). The transmitter coil 97 is coupled to low-voltage control circuitry 101 that is preferably located outside the NG housing 34. The pickup coil 99 is coupled between the output of the HV ladder 71 and the DC power supply circuit 91. The control circuitry 101 generates an AC signal that is supplied to the transmitter coil 97, which induces an AC signal in the pickup coil 99 via the inductive interface therebetween for supply to the DC power supply circuit 91.

Figure 6:
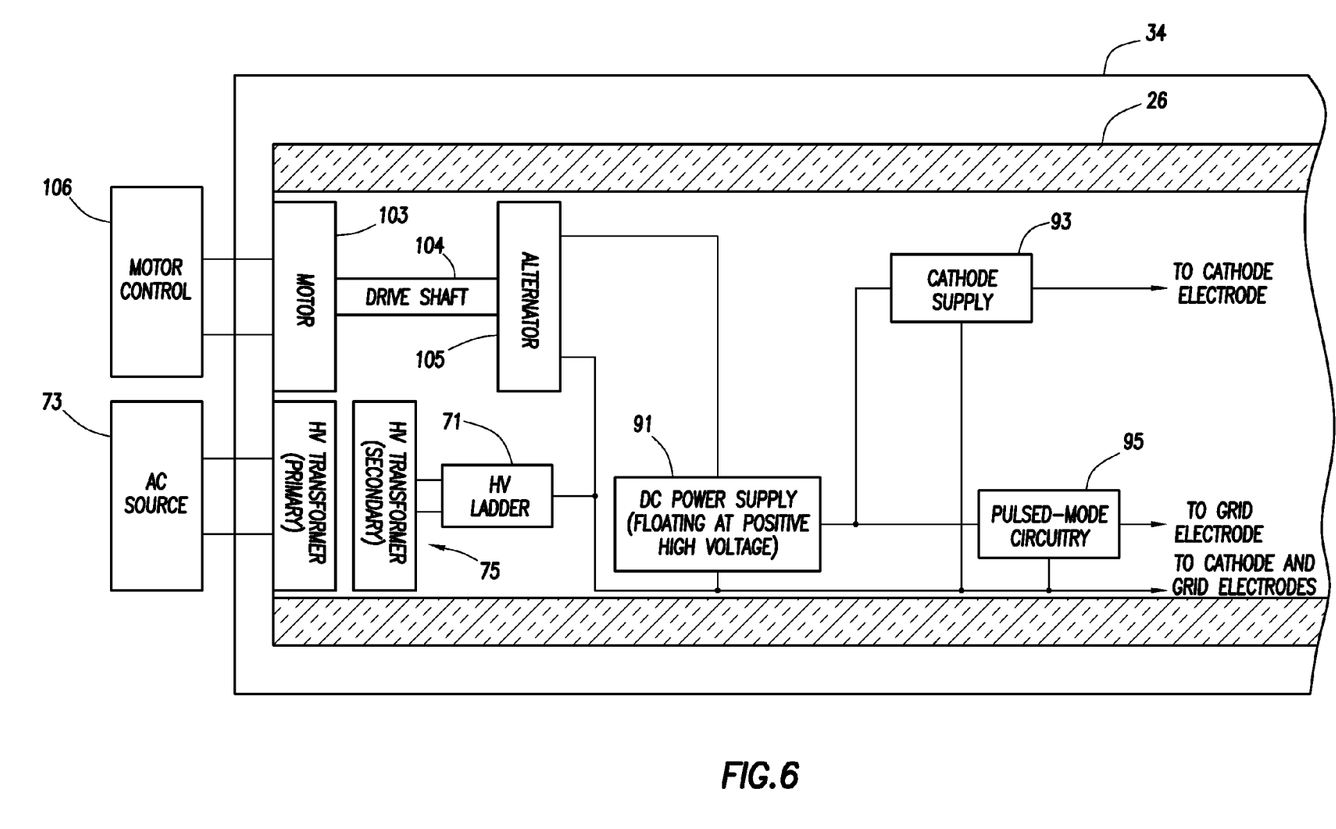
FIG. 6 is a schematic view of another embodiment of high voltage power supply circuitry and supporting control circuitry for use in the neutron generators of FIGS. 1-3.

In another embodiment shown in FIG. 6, a motor 103 operating outside the high voltage environment and preferably disposed within the NG housing 34 drives an electrically-insulated shaft 104 coupled to an alternator 105 operating inside the high voltage environment (i.e., located within the interior space defined by the high voltage insulation 26). The alternator 105 is coupled between the output of the HV ladder 71 and the DC power supply circuit 91. The output of the alternator 105 generates the input AC signal for supply to the DC power supply circuitry 91. The motor 103 is controlled by low voltage control circuitry 106 that is preferably located outside the NG housing 34. In an alternate embodiment (not shown), a non-conducting hydraulic fluid loop can be used to drive the alternator 105 operating inside the high voltage environment. In this configuration, the hydraulic fluid loop is pressurized by a pump located outside the high voltage environment.

Figure 7A:
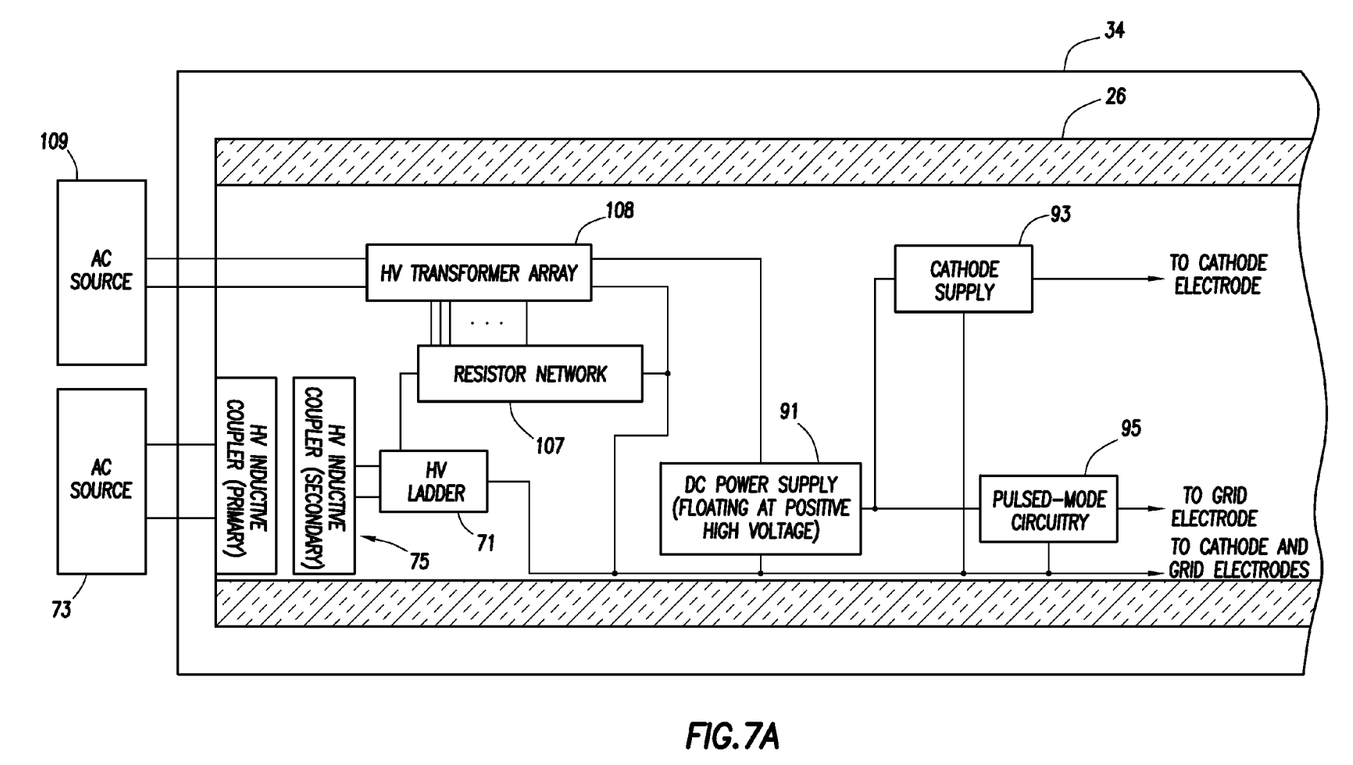
FIG. 7A is a schematic view of yet another embodiment of high voltage power supply circuitry and supporting control circuitry for use in the neutron generators of FIGS. 1-3.
Figure 7B:
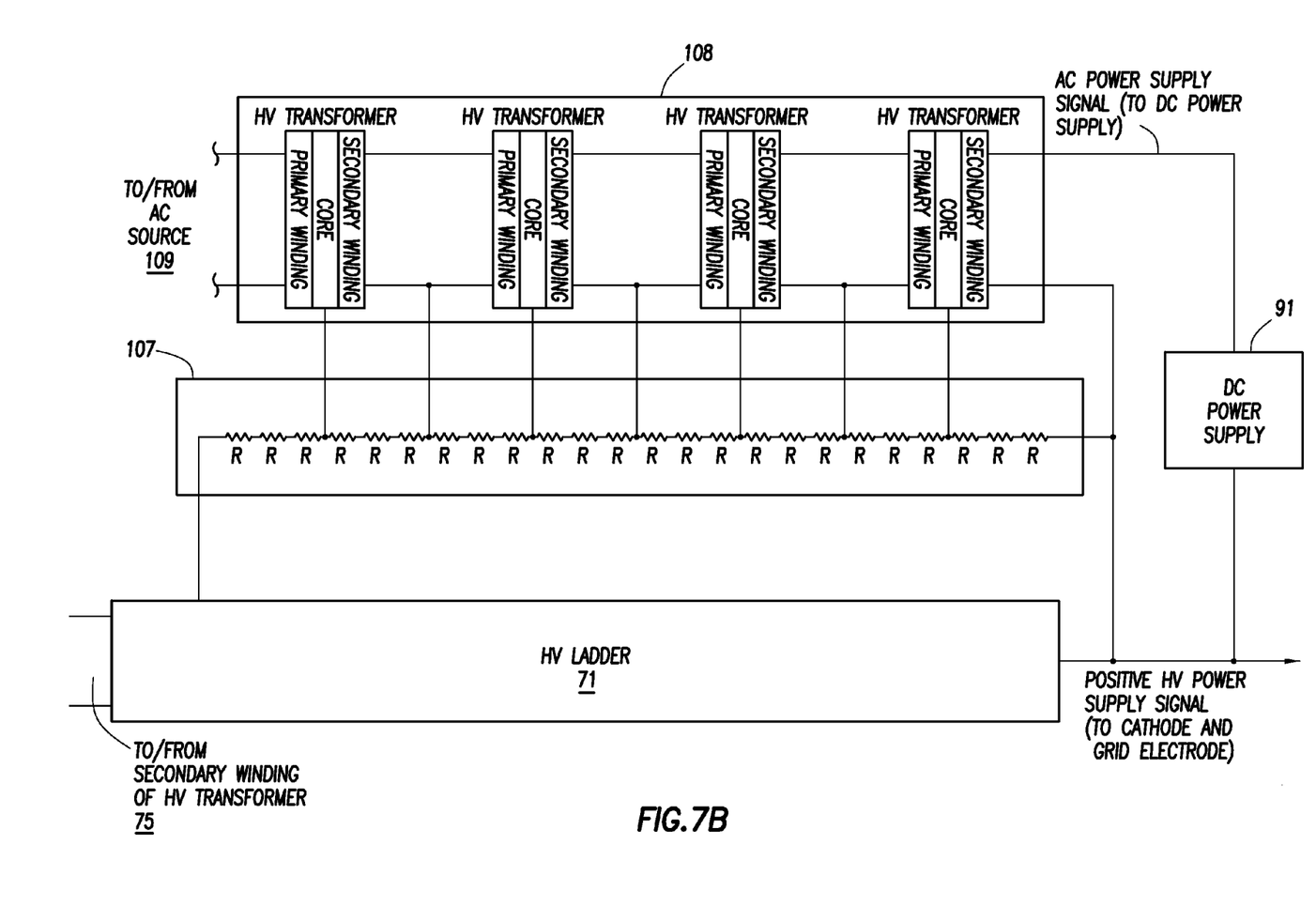
FIG. 7B is a block diagram of the high voltage power supply circuitry of FIG. 7A.

In yet another embodiment shown in FIGS. 7A and 7B, a resistive divider network 107 is located in the high voltage environment (i.e., located within the interior space defined by the high voltage insulation 26) and coupled to the output of the HV ladder 71. A linear array of small-size transformers 108 is also disposed inside the high voltage environment. The transformers of the array 108 are preferably constructed from small-size cores (which can be realized from an amorphous metallic alloy for greater efficiency) with primary and secondary windings fabricated from small diameter high voltage cable. The input of the transformer array 108 is coupled to an AC signal source 109 located outside the high voltage environment (preferably located outside the NG housing 34). The secondary windings of the transformers of the array 108 (except for the last transformer) are coupled to the primary windings of the next transformer in the array as well as to nodes along the resistor divider network 107 as best shown in FIG. 7B. The cores of the transformer array 108 are also coupled to nodes along the resistive divider network 107 as best shown in FIG. 7B. The transformer array 108 produces an AC signal that is supplied to the DC power supply circuitry 91. The AC signal output by the transformer array 108 is controlled by the operation of the AC source 109. Advantageously, the individual transformers of the linear array 108 have reduced high voltage standoff requirements as the high voltage potential of the environment is distributed across the transformers of the array. These reduced standoff requirements enable the transformers to be reduced in size, which is advantageous for space-constrained environments such as in logging tools as described herein.

Figure 8:
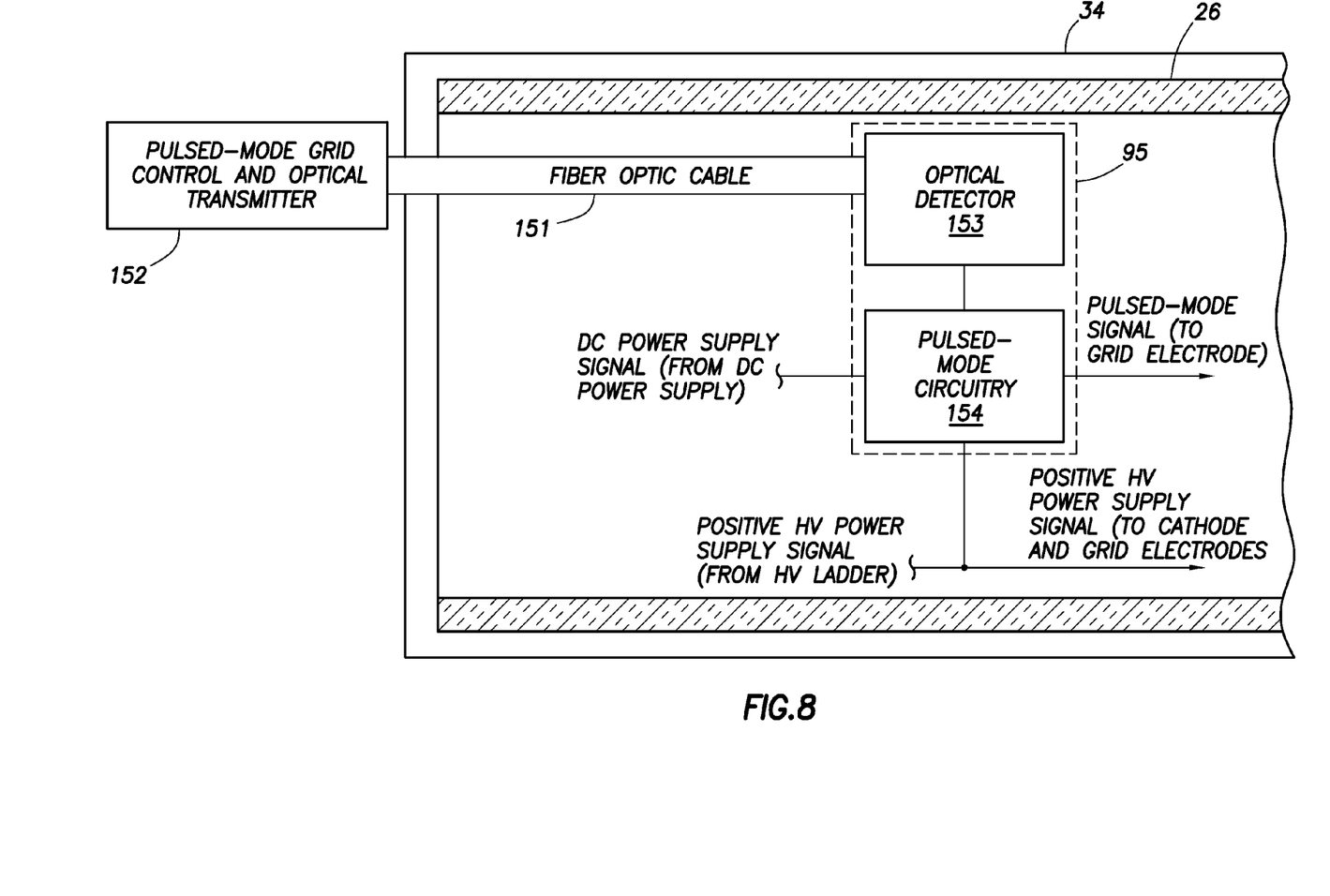
FIG. 8 is a schematic view of an optical interface for interfacing to the high voltage power supply circuitry of FIGS. 1-7B.
Figure 9:
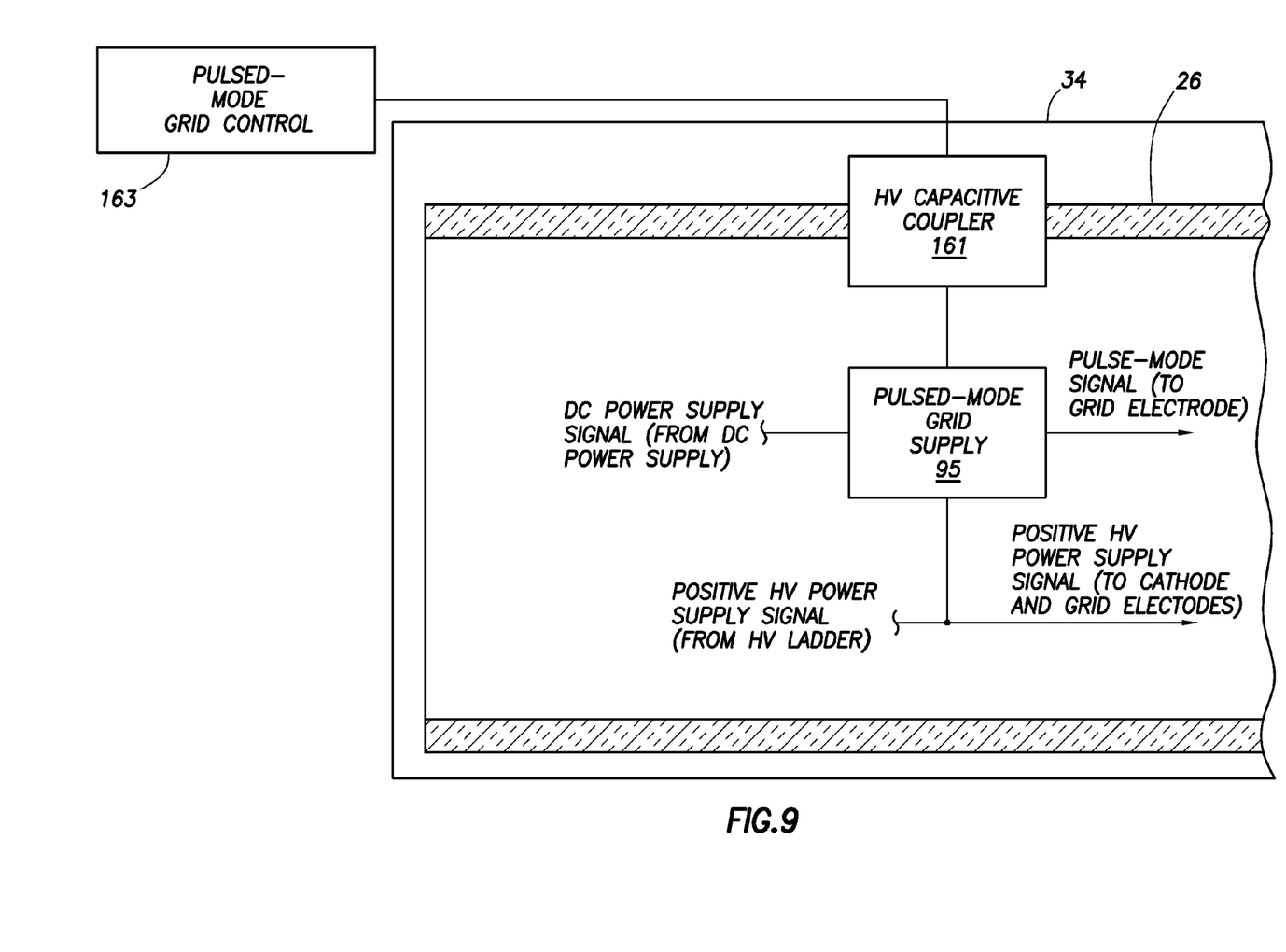
FIG. 9 is a schematic view of a capacitive coupler interface for interfacing to the high voltage power supply circuitry of FIGS. 1-7B.

In the embodiments described herein, the burst rate and durations of the pulsed output signals supplied by the pulsed-mode grid supply circuitry 95 to the grid electrode 22 are controlled by an interface between low voltage control circuitry and the pulsed-mode grid supply circuitry 95 located with the high voltage environment of the high voltage power supply circuitry 24. This interface can be an optical interface that employs optical control signals. For example, as shown in FIG. 8, the optical interface can be realized by a fiber optic cable 151 located within the high voltage environment (i.e., located within the interior space defined by the high voltage insulation 26). The fiber optic cable 151 carries optical control signals generated by an optical transmitter (e.g., LED or laser diode) as part of low voltage pulsed-mode control circuitry 152. The pulsed-mode control circuitry 152 is preferably located outside the NG housing 34. The pulsed-mode grid supply circuitry 95 includes an optical detector 153 that receives the optical control signals generated by the optical transmitter of the control circuitry 152 and carried by the fiber optic cable 151 as well as circuitry 154 for generating pulsed output signals (e.g., positive pulses in the range of +100 to +300 volts relative to the floating positive high voltage potential produced by the HV ladder 71) with burst rate and durations dictated by the optical control signals detected by the optical detector 153. The pulsed output signals generated by circuitry 154 are supplied to the grid electrode 22. Alternatively, as shown in FIG. 9, a high voltage capacitive coupler 161 can be mounted to the high voltage insulation 26 and used to communicate control signals between low voltage pulsed-mode control circuitry 163 and the pulsed-mode grid supply circuitry 95 of the high voltage power supply 24. The burst rate and durations of the pulsed-mode signals generated by the pulsed-mode grid supply circuitry 95 are dictated by the electrical control signals communicated by the high voltage capacitive coupler 109, In this configuration, the high voltage capacitive coupler 161 provides for communication of control signals from outside to inside the high voltage environment of the high voltage power supply circuitry 24 while maintaining high voltage standoff of the high voltage environment. Other suitable interfaces can be used.

Figure 10A:
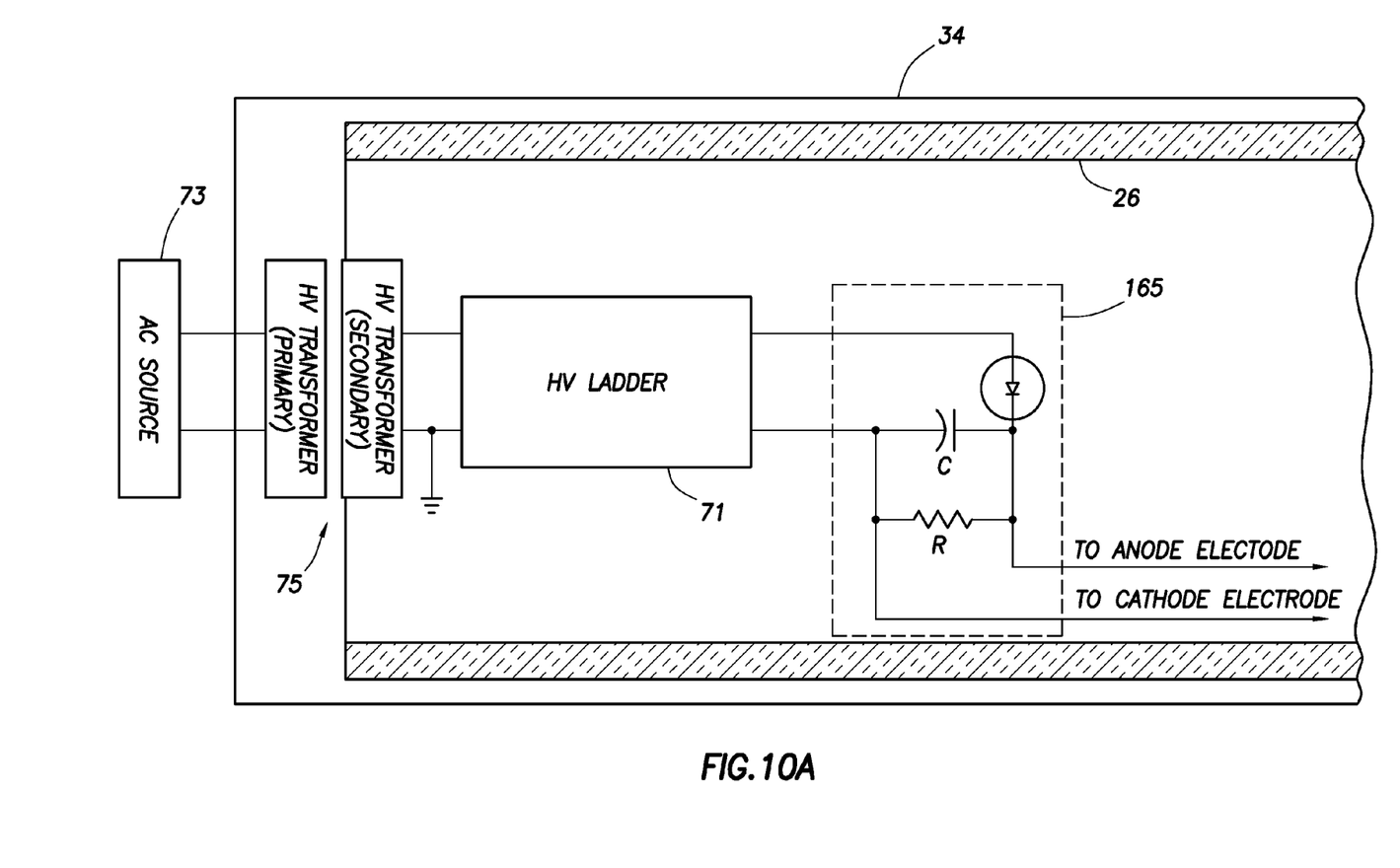
FIGS. 10A and 10B are schematic views of others embodiments of high voltage power supply circuitry and supporting control circuitry for use in a neutron generator employing a Penning ion source.
Figure 10B:
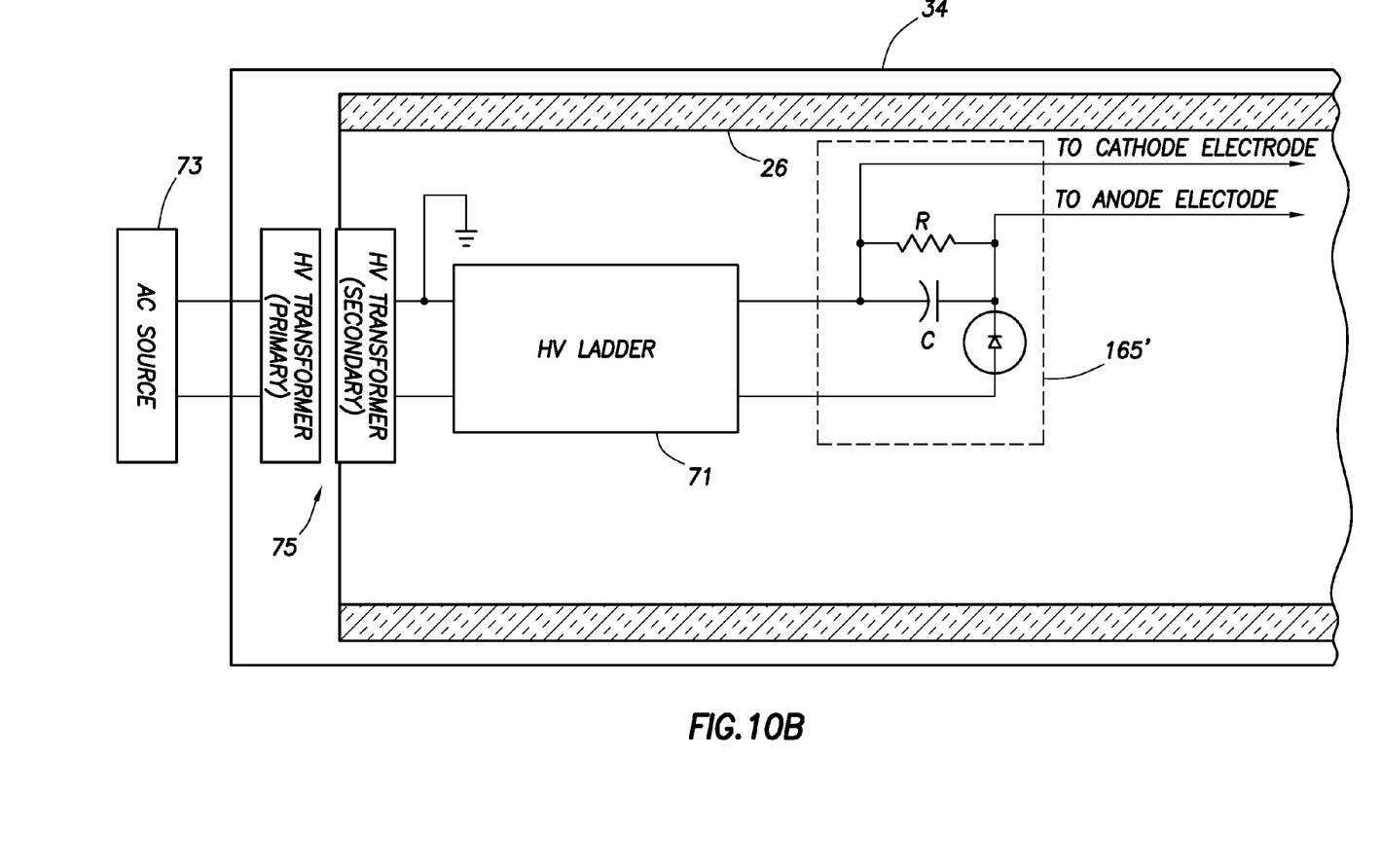

In alternate embodiments, other ion source electrode configurations, such as cold cathode (Penning) ion source and RF-driven ion source configurations can be used. In such configurations, the high voltage power supply circuitry as described herein can be adapted to float the high voltage electrode(s) of the ion source at the desired positive high voltage potential and apply low voltage signals relative to the positive high voltage potential for operating the high voltage electrode(s) of the ion source. FIGS. 10A and 10B illustrate two exemplary embodiments of high voltage power supply circuitry suitable for powering the anode and cathode electrodes of a Penning ion source of the neutron generator. The high voltage power supply circuitry includes a Cockcroft-Walton HV ladder 71. An AC source 73, preferably located outside the NG housing 34, is operated to drive the HV ladder 71 through an HV transformer 75 as is well known. The HV ladder has two legs, one of which has a grounded input. The output of the grounded input leg of the HV ladder 71 produces a positive high voltage signal that is supplied to the cathode electrode of the Penning ion source. The output of the other leg of the HV ladder 71 is coupled to a parallel resistor-capacitor network through a diode as part of circuit 165. The output of the parallel resistor-capacitor network is supplied to the anode electrode of the Penning ion source. The resistor and capacitor of circuit 165 are connected in parallel between the diode output and the output of the grounded input leg of the HV ladder 71. The positive voltage potential difference between the anode and cathode electrodes of the Penning ion source, which is typically on the order of 1 KV, is developed across the capacitor of circuit 165. The capacitance of the capacitor of circuit 165 is relatively large (for example, on the order of 0.015 μF) to provide ripple filtering. The resistor of circuit 165 realizes a shunt path whose resistance is selected to provide the proper positive voltage potential difference between the anode and cathode electrodes of the Penning ion source.

Advantageously, the neutron generator of the present invention employs a grounded target electrode, which reduces the need for high voltage insulation of the target electrode. Because most good high voltage insulators provide poor thermal conduction, the reduction of high voltage insulation for the target electrode facilitates heat removal (cooling). Furthermore, with the target electrode operating at or near ground potential, problems associated with electron current leakage from the surfaces of the target electrode are avoided. Moreover, with adequate cooling of the grounded target, run away depletion of the target under high beam operation can be avoided, which allows for sustenance of higher neutron output per unit beam current on the target.

There has been described and illustrated herein an embodiment of a neutron generator, a method of operating same as well as a logging tool based thereon. While a particular embodiment of the invention has been described, it is not intended that the invention be limited thereto, as it is intended that the invention be as broad in scope as the art will allow and that the specification be read likewise. Thus, while particular logging tools have been disclosed, it will be appreciated that the neutron generator of the present invention can be used in other logging tools as well as other applications. In addition, while particular configurations have been disclosed in reference to the neutron generator of the present invention, it will be appreciated that other configurations could be used as well. For example, the gas reservoir of the neutron generator can be disposed near or adjacent the ion-source end of the sealed envelope and powered by high voltage power supply circuitry. In such a configuration, the high voltage power supply circuitry is adapted to float the gas reservoir at positive high voltage levels as desired. Low voltage control circuitry can be provided to control the gas reservoir. The interface between the low voltage control circuitry and the high voltage power supply circuitry that operates the gas reservoir can be realized by any one of the interfaces described herein (e.g., inductive or optical or mechanical) that provide isolation between low voltage control circuitry and the high voltage power supply circuitry. It will therefore be appreciated by those skilled in the art that yet other modifications could be made to the provided invention without deviating from its spirit and scope as claimed.

What is claimed is:

1. A neutron generator comprising:
   a sealed envelope providing a low pressure environment for a gas, said sealed envelope including a target electrode spaced apart from an ion source including at least one electrode;
   a high voltage power supply circuit for supplying a positive high voltage signal to the at least one electrode of said ion source, said positive high voltage signal having a low voltage signal component floating on a positive high voltage signal component;
   high voltage insulation that surrounds and electrically insulates said high voltage power supply circuit;
   a control circuit, isolated from said high voltage power supply circuit and operating at low voltage potentials, for controlling generation of the low voltage signal component, wherein the control circuit includes an inductive interface for interfacing said control circuit to said high voltage power supply, the inductive interface including a transmitter coil located external to said high voltage insulation and a pickup coil located inside said high voltage insulation and electrically coupled to the at least one electrode of said ion source; and
   wherein said at least one electrode of said ion source operates at the positive high voltage potential of the positive high voltage signal and said target electrode operates at or near ground potential in order to accelerate ions of a plasma produced by said ion source toward said target electrode to induce collisions of ions with target material in the target electrode, thereby causing reactions that generate neutrons.

2. A neutron generator according to claim 1, wherein:
   said high voltage power supply circuit comprises a circuit for generating the positive high voltage signal component.

3. A neutron generator according to claim 2, wherein:
   the circuit for generating the positive high voltage signal component comprises a Cockcroft-Walton voltage multiplier circuit.

4. A neutron generator according to claim 3, wherein:
   said ion source includes an anode electrode and a cathode electrode; and
   said Cockcroft-Walton voltage multiplier circuit has two legs, one of which has a grounded input, wherein output of the grounded input leg produces a positive high voltage signal that is supplied to said cathode electrode, and output of the other leg is coupled to a parallel resistor-capacitor network through a diode, wherein output of the parallel resistor-capacitor network is supplied to said anode electrode.

5. A neutron generator according to claim 1, wherein:
   the low voltage signal component comprises an AC signal component suitable for operating the at least one electrode of the ion source.

6. A neutron generator according to claim 1, wherein:
   the low voltage signal component comprises a DC signal component suitable for operating the at least one electrode of the ion source.

7. A neutron generator according to claim 1, wherein:
   the positive high voltage signal component is supplied to said pickup coil.

8. A neutron generator according to claim 1, further comprising:
   a plurality of control circuits for controlling generation of low voltage signal components suitable for operating respective electrodes of said ion source; and
   a plurality of inductive interfaces for interfacing respective ones of said plurality of control circuits to said high voltage power supply and electrically coupled to respective electrodes of said ion source, each inductive interface including a transmitter coil located external to said high voltage insulation and a pickup coil located inside said high voltage insulation and electrically coupled to a respective electrode of said ion source.

9. A neutron generator according to claim 1, wherein:
   the low voltage signal component comprises a pulsed-mode signal component suitable for operating a given electrode of said ion source.

10. A neutron generator according to claim 9, wherein:
    the high voltage power supply circuit means comprises a DC power supply circuit floating on the positive high voltage signal component and a pulse generator circuit coupled between said DC power supply circuit and the given electrode of said ion source, the pulse generator circuit for generating said pulsed-mode signal component for supply to the given electrode of said ion source.

11. A neutron generator according to claim 10, wherein:
    the given electrode of said ion source is a grid electrode.

12. A neutron generator according to claim 11, wherein:
    said pulse mode signal component comprises positive and negative pulses with a magnitude in a range between 100 to 300 volts relative to the positive high voltage signal component.

13. A neutron generator according to claim 10, wherein:
the low voltage signal component comprises a DC component suitable for operating another given electrode of said ion source, wherein said DC component is derived from output of DC power supply circuit.

14. A neutron generator according to claim 13, wherein:
said another given electrode of said ion source comprises a dispenser cathode electrode.

15. A neutron generator according to claim 10, further comprising:
a control circuit, isolated from said DC power supply circuit and operating at low voltage potentials, for controlling operation of said DC power supply circuit.

16. A neutron generator according to claim 15, further comprising:
an inductive interface for interfacing said control circuit to said DC power supply circuit, said inductive interface including a transmitter coil located external to said high voltage insulation and a pickup coil located inside said high voltage insulation and electrically coupled to said DC power supply circuit.

17. A neutron generator according to claim 10, further comprising:
an alternator, surrounded by the high voltage insulation, for venerating an AC signal for input to said DC power supply circuit.

18. A neutron generator according to claim 17, wherein:
said alternator is mechanically driven by a motor operating at low voltage potentials.

19. A neutron generator according to claim 17, wherein:
said alternator is mechanically driven by a non-conducting hydraulic fluid loop.

20. A neutron generator according to claim 17, wherein:
said high voltage power supply circuit means comprises circuit means for generating the positive high voltage signal component; and
said alternator is electrically coupled to said circuit means for generating the positive high voltage signal component.

21. A neutron generator according to claim 10, further comprising:
an array of small size transformers, surrounded by the high voltage insulation, for generating an AC signal for input to said DC power supply circuit.

22. A neutron generator according to claim 21, wherein:
said high voltage power supply circuit means comprises circuit means for generating the positive high voltage signal component and a resistor divider network electrically coupled to the output of the circuit means; and
said array of small size transformers are arranges in a sequence with secondary windings and cores of said transformers coupled to nodes along said resistor divider network.

23. A neutron generator according to claim 10, further comprising:
a pulse control means, galvanically isolated from said pulse generator circuit, for synchronizing operation of the pulse generator circuit.

24. A neutron generator according to claim 23, wherein:
said pulse control means comprises an optical transmitter and said pulse generator circuit comprises an optical receiver that is optically coupled to said optical transmitter by a fiber optic cable that extends therebetween.

25. A neutron generator according to claim 23, further comprising:
a high voltage insulating capacitive coupler providing an interface between said pulse control means and said pulse generator circuit.

26. A neutron generator according to claim 1, further comprising:
a gas supply for supplying ionizable gas to said sealed envelope.

27. A neutron generator according to claim 26, wherein:
said gas supply includes a filament and a current source that heats said filament.

28. A neutron generator according to claim 1, wherein:
said high voltage insulation comprises solid-form high voltage insulation.

29. A neutron generator according to claim 28, wherein:
said solid-form high voltage insulation comprises at least one tubular member realized from perfluoroalkoxy.

30. A neutron generator according, to claim 28, wherein:
said solid-form high voltage insulation comprises two or more concentric tubular members realized from perfluoroalkoxy, each having a wall thickness of at least 0.04 inches.

31. A neutron generator according to claim 28, further comprising:
a first housing that houses said sealed envelope and said solid-form high voltage insulation.

32. A neutron generator according to claim 31, wherein:
said solid-form high voltage insulation extends between said sealed envelope and said first housing over a substantial portion of the lengthwise dimension of said sealed envelope.

33. A neutron generator according to claim 31, wherein:
at least one of liquid-form electrically insulating, material and gas-form electrically insulating material fill the space between said sealed envelope and said first housing for insulating purposes.

34. A logging tool for investigating earth formations surrounding a borehole, comprising a sonde incorporating at least one radiation detector and a neutron generator according to claim 1.

* * * * *